even when manually applied input signals are applied thereto

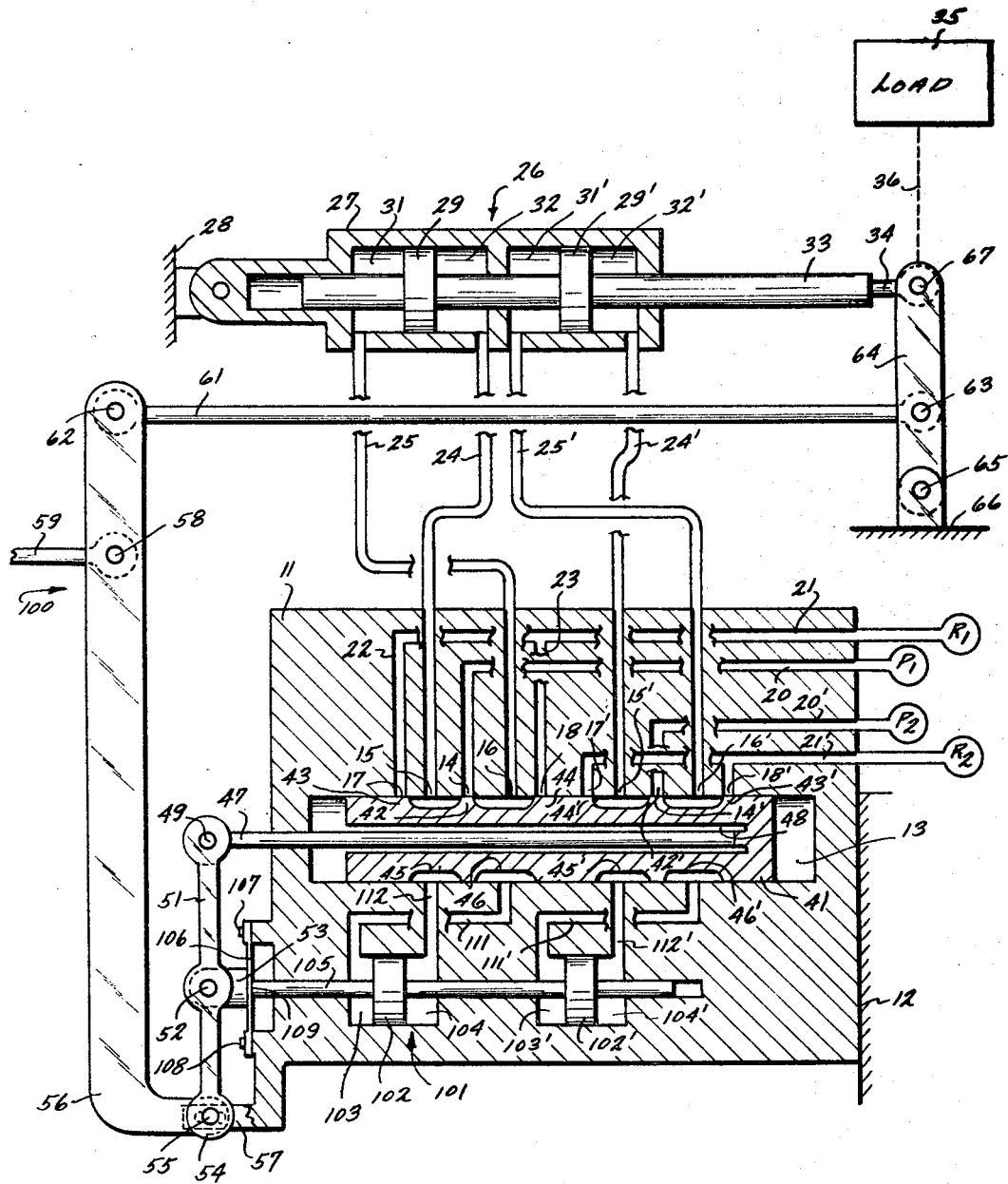

United States Patent Office
3,398,647
Patented Aug. 27, 1968

3,398,647
SERVO CONTROL SYSTEM UTILIZING LOAD PRESSURE FEEDBACK APPARATUS
George T. Baltus and Raymond Warmuz, Tonawanda, N.Y., assignors to Bell Aerospace Corporation, a corporation of Delaware
Filed June 6, 1966, Ser. No. 555,418
4 Claims. (Cl. 91—384)

ABSTRACT OF THE DISCLOSURE

Disclosed is a negative feedback apparatus adapted to be responsive to any pressure differential appearing across the actuator, irrespective of how the pressure differential is created. The negative feedback apparatus comprises a pressure differential sensitive device in the form of a piston having a rod connected thereto. The rod in turn is connected through a mechanical linkage to a control valve which controls the flow of fluid under pressure between a source thereof and the actuator which is connected to the load.

---

This invention relates generally to servo control systems and more particularly to hydraulically powered servo control systems adapted to receive manually applied input signals and which systems utilize load pressure feedback apparatus.

The utilization of hydraulically powered servo control systems for the positioning of loads of various types is well known in the prior art. It is also well known that when such systems are utilized, typically the hydraulic control valve within the system applies full hydraulic power to the load upon the application of a small command or error signal to the valve. If the load to which the hydraulic power actuator is connected is one having large inertia at the particular moment that the full power is applied thereto, damage can be imparted to the load or to the linkages interconnecting the control system and the load.

Furthermore particularly where loads having large inertia are being positioned by the control system, a feedback signal can be applied upon deceleration of the load which causes the servo control system to operate in such a manner as to attempt to correct the feedback signal. Such attempted correction in turn causes command signals of the opposite direction to be applied to the system and to the load. Such can continue and cause the load to go into oscillation in such a manner that damage or actual total destruction can be imparted to the load or to the control apparatus.

Furthermore many manual input power control systems are limited in their dynamic performance capability because of undesired deflections of the structure to which the actuator and load attach when command signals call for acceleration or deceleration of the inertial load. These structural deflections in many control systems are de-stabilizing in nature and act to produce load oscillation as noted above.

Accordingly it is an object of the present invention to provide apparatus automatically sensitive to pressures created by both acceleration and deceleration of the load and which is operative in response thereto to relieve such pressures.

It is another object of the present invention to provide apparatus sensitive to load-created pressures which apparatus utilizes said pressures to stabilize the control system including said apparatus.

It is a further object of the present invention to provide a manually controlled hydraulic servo control system which is capable of controlling large inertia loads in a manner more stable than heretofore possible with prior art control systems.

It is yet another object of the present invention to provide apparatus sensitive to load-created pressures and capable of applying signals indicative of such pressures which is simpler, easier to maintain, and introduces less friction than prior art systems heretofore known.

It is yet another object of the present invention to provide a manually controlled hydraulic servo control system which is adapted to introduce a lag in the response of the system to command signals when controlling large inertia loads thereby obtaining an improved system stability characteristic for the control of such loads to permit an optimum combination of high control loop gain with adequate system stability for improved system accuracy and response.

It is yet another object of the present invention to provide a manually controlled hydraulic servo control system in which a load pressure feedback apparatus generates a signal which acts in a manner to oppose or cancel out the destabilizing structural deflections inherent in many power control systems when coupled to large inertial loads.

It is yet another object of the present invention to provide a manually controlled hydraulic servo control system which is adapted to introduce a lag when command signals are applied, and a large inertia load is present, to the system to preclude damage to the load, to mechanical linkages, and other parts of the system.

Other objects and advantages of the present invention will become apparent from a consideration of the following description taken in conjunction with the accompanying drawing which is presented by way of example only and is not intended as a limitation upon the scope of the present invention as defined in the appended claims and in which:

The single figure is a schematic representation of a manually controlled hydraulically powered servo control system having load pressure feedback capabilities in accordance with the present invention.

A load pressure feedback apparatus in accordance with the present invention is particularly adapted for utilization in a hydraulic servo control system having a power valve for controlling the flow of hydraulic fluid under pressure to an actuator piston which is connected to a load member. A mechanical linkage is operatively connected to the power valve to receive manual input signals applied to the system. The load pressure feedback apparatus includes a slidable member disposed within a bore formed in a housing and is operable to separate the bore into a pair of chambers. A double-acting spring means engages the slidable member to maintain it in a neutral position in the absence of differential pressures thereacross. There is provided means communicating between the pair of chambers in the bore and each side of the actuator cylinder so as to continuously apply the pressure which appears across the actuator across the slidable member. Linkage means is operably interconnected between the slidable member and the power valve to cause the power valve to move in response to a change in differential pressure across the slidable member from the actuator.

Referring now to the single figure there is therein illustrated in schematic form a mechanical input hydraulically powered servo control system having a load pressure feedback apparatus in accordance with the present invention. As is shown, there is provided a housing 11 which is connected to a fixed structure as is illustrated by the ground symbol 12. The housing 11 defines a cylinder 13 therein. The cylinder defines an input port 14, a pair of working ports 15 and 16, and a pair of return or exhaust ports 17 and 18. The input port 14 is connected by means of a conduit or passageway 20 to a source of hydraulic fluid under pressure illustrated by the symbol P1. A conduit 21 interconnects the system return R1 to return or exhaust ports 17 and 18 by means of branch conduits 22 and 23 respectively. Conduits 24 and 25 connect working ports 15 and 16 respectively to a power actuator 26.

The power actuator 26 defines a cylinder 27 which is attached at one end to a fixed structure as is shown by the ground symbol 28. The cylinder 27 has a piston 29 slidably disposed therein in a manner well known to the prior art in such a way as to define a pair of compartments 31 and 32 on opposite sides thereof. The conduit 25 communicates with the compartment 31 while the conduit 24 communicates with the compartment 32. The piston 29 has a rod 33 interconnected thereto and having one end 34 thereof connected to a load 35 as is indicated by the dashed line 36. It should be understood that the connection between the load 35 and the rod 33 may be direct and solid and such is preferred when high inertia loads are to be controlled. Movement of the piston 29 and the rod 33 positions the load 35 in accordance with command signals applied to the hydraulic control systems as will be more fully explained hereinbelow.

Flow of hydraulic fluid from the source P1 under pressure thereof to the actuator 26 is controlled by a spool valve 41 slidably disposed within the cylinder 13 in the housing 11. The spool valve 41 defines a land 42 which when in the neutral position as illustrated blocks input port 14. Lands 43 and 44 on the spool valve 41, when it is in its neutral position, block return ports 17 and 18 respectively. The working ports 15 and 16 are in communication with the space provided by the reduced diameter portions 45 and 46 between the lands 42 and 43 and 42 and 44 respectively.

A push rod 47 is rigidly affixed to the spool valve 41 by being extended through a bore 48 provided therein. By this interconnection more reliable operation of the spool valve 41 is effected. The push rod 47 is pivotally connected at pivot point 49 to a spool valve input linkage 51. The linkage 51 is pivoted at point 52 upon a fulcrum 53. The opposite end 54 of the linkage 51 is pivotally connected at point 55 to a walking beam 56. A bracket 57 extends downwardly from the housing 11 and operates as a stop member to preclude excessive movement of the linkage 51.

The walking beam 56 is connected at point 58 to an input rod 59 which is adopted to receive input signals from any source desired but specifically in the present instance from a manual control source such as an operator physically applying mechanical input signals to the apparatus.

A follow-up link 61 is connected to the walking beam at the upper end thereof at pivot point 62. The opposite end of the follow-up link 61 is connected at pivot point 63 to the arm 64 which is connected at a pivot point 65 thereof to a fixed structure as shown by the ground symbol 66. The opposite end of the arm 64 is connected at pivot point 67 to the actuator rod 33 at the end 34 thereof.

It should become apparent at this point that there is a duplication of the hydraulic system in the apparatus illustrated in the accompanying drawing. It should be understood that although such is often desired for various reasons, among them redundancy for reliability, such is not necessary for the present invention. The various parts which are duplicates in the hydraulic system are indicated by the utilization of the same reference numeral primed and will not be described further in the specification.

Operation of the system thus far described will now be given in order to better enable a thorough understanding of the present invention. For purposes of such description it will be assumed that hydraulic fluid under pressure has been applied to the system and that all portions thereof are filled with said fluid; i.e., the chambers 31 and 32 of the actuator 26 and all of the interconnecting conduit lines between the source P1 and the return R1 are filled with hydraulic fluid. Under these operating conditions it will be assumed that a manual input signal is applied by the rod 59 to the walking beam 56, in the direction of the arrow 100. Application of such a signal causes the walking beam 56 to pivot about the point 62 and thus apply a force to the bottom of the spool valve input link 51 at the pivot point 55 thereof. The spool valve input link 51 pivots upon the point 52 connected to fulcrum 53 to thus apply a force to the push rod 47 toward the left as viewed in the drawing. Such movement of the push rod causes the spool valve 41 to also move toward the left. Such movement toward the left causes the land 42 to uncover the input port 14 and the land 43 to uncover the return port 17 in the cylinder 13. Hydraulic fluid under pressure thereby flows from the source P1 through the conduit 20, through the input port 14, into the reduced diameter area 46 between the lands 42 and 44, out the working port 16, through the conduit 25 and to the compartment 31 of the actuator 26. As the hydraulic fluid under pressure thus flows into the compartment 31, the piston 29 is caused to move toward the right as viewed in the drawing. Such movement of the piston toward the right causes hydraulic fluid to flow from the compartment 32 through the conduit 24, through the working port 15, into the reduced diameter area 45 between the lands 42 and 43 on the spool valve 41, through the exhaust port 17, the branch conduit 22 and the conduit 21 to system return R1.

As the piston 29 in the actuator 26 moves toward the right, the load 35 is positioned accordingly. As the load is thus positioned the arm 64 moves toward the right pivoting about the point 65 which is grounded at 66 as above described. As the arm 64 moves toward the right, the follow-up link 61 also moves toward the right. Such movement in turn causes the walking beam 56 to pivot about the point 58 which is now stationary, thus causing the lower end thereof to move toward the left as viewed in the drawing. Such movement toward the left causes the spool valve input link 51 to pivot in a clockwise direction about its pivot point 52, thus applying a force toward the right on the push rod 47. This force to the right of the push rod 47 causes the spool valve 41 to move toward the right as viewed in the drawing. This movement toward the right, as will be recalled, is opposite to the direction initially imparted to the spool valve 41 when the input signal was applied thereto. As the spool valve 41 thus moves toward the right, the lands 42 and 43, when the load 35 has been placed in the position initially commanded, again covers the ports 14 and 17 respectively and the valve is again in its neutral or quiescent condition and the load is at its new commanded position. Obviously if an input signal opposite in direction to that illustrated by the arrow 100 is applied to the input rod 59, the series of events above described will occur but in reverse directions.

It can be seen that upon the application of the input signal in the direction shown by the arrow 100 to the walking beam 56, full pressure can be applied abruptly from the source P1 of hydraulic fluid to one side of piston 29 and ultimately to the load 35. As above described such is not always desirable, particularly if the load 35 represents a load having high inertia. If such is the case, large differential pressures will be built up across the piston 29 of the actuator 26.

In accordance with the present invention, there is provided apparatus which automatically senses this pressure differential and alleviates the same. Such apparatus in accordance with the present invention is provided by the housing 11 defining a bore 101 therein. A slidable member, for example such as a load pressure piston 102, is positioned within the bore 101 and separates the same into chambers 103 and 104. A piston rod 105 is affixed to the piston 102 and moves therewith. Spring means such as a flat spring 106 is affixed at each of its ends thereof rigidly to the housing 11 by means such as bolts 107 and 108 as illustrated. The rod 105 is connected at its end 109 to the center of the spring 106. Also connected substantially at the center of the spring 106 and to the rod 105 is the fulcrum 53 for the spool valve input link 51. Chamber 103 of the bore 101 is interconnected by means of conduit 111 to the reduced diameter area 46 between the lands 42 and 44 on the spool valve 41. The chamber 104 of the bore 101 is connected by way of conduit 112 to the reduced diameter area 45 between the lands 42 and 43 on the spool valve 41. As will be remembered, the conduits 25 and 24 are connected respectively to the same reduced diameter areas 46 and 45 and also to the compartments 31 and 32 respectively of the actuator 26. Thus it can be seen that by way of conduit 24, the reduced diameter area 45 of the spool 41 between the lands 42 and 43, and the conduit 112 there is communication between the chamber 104 in the bore 101 and the compartment 32 in the actuator 26. It should also be clear that by way of conduit 25, the reduced diameter area 46 between the lands 42 and 44 of the spool 41 and the conduit 111 there is communication between the chamber 103 in the bore 101 and the compartment 31 in the actuator 26. As a result of this direct communication from the actuator 26 to the bore 101, the pressure differential across the piston 29 is applied directly across the piston 102.

Under those conditions wherein the pressure appearing across the piston 102 is equal or very minimal, the spring 106 maintains the piston 102 in a centered position as illustrated in the drawing. However, as a differential pressure develops across the piston 29 due to the acceleration or deceleration of load 35, then the piston 102 moves in response to the pressure differential thereacross in an amount proportional to said pressure differential.

Assume now for purposes of example that the signal is applied to the rod 59 in the direction of the arrow 100 as above described and that the load 35 is one representing a high inertia. As a result thereof, a very large pressure differential appears across the piston 29 in the actuator 26, the pressure being extremely high in compartment 31 and extremely low in compartment 32. Under these circumstances the pressure also appears likewise across the piston 102, being high in chamber 103 and low in chamber 104. As a result thereof the piston 102 is caused to move toward the right as viewed in the drawing. As the piston 102 moves toward the right, the rod 105 moves likewise. As the rod 105 moves toward the right, the spring 106 also moves toward the right carrying the fulcrum 53 therewith. As the fulcrum 53 moves toward the right, the pivot point 52 of the spool valve input link 51 also moves toward the right.

Such movement toward the right of fulcrum 53 acts in opposition to the commanded movement of link 51 and spool 41 thereby causing said spool movement in the opening direction to lag behind the command input acceleration at rod 59. That is, the characteristics of the high inertia load introduce the large differential pressure into the feedback chambers upon the application of the input command signal to prevent the spool 41 opening the working ports as wide as would be the case without the feedback network. As the velocity of actuator 26 and load 35 approaches the command input velocity at rod 59, the pressure differential across pistons 29 and 102 decreases and fulcrum 53 moves toward its neutral position under the centering action of spring 106. Thus, spool 41 is now caused to move to a further open position, which position is proportional to the command input velocity under a zero acceleration (or deceleration) condition. As the command input movement decelerates to approach a new commanded position, a pressure differential again develops across pistons 29 and 102. The polarity of said pressure differential is now opposite to that which developed when the load was being accelerated in the same direction of motion. The pressure feedback now causes fulcrum 53 to move in a manner that produces a lag in the movement of spool 41 back to its neutral or closed off position. When the deceleration is completed and load 35 is stationary at its new position, fulcrum 53 is again restored to its neutral position and spool 41 is also at its neutral or shutoff position.

There has thus been described a hydraulically powered servo control system for the positioning of a load in response to mechanically applied input signals which is adapted for sensing load pressure signals and automatically for alleviating the same irrespective of whether they are applied as a result of the application of command signals attempting to accelerate or decelerate the load or as a result of external forces acting to disturb the load from its commanded position. It should be recognized that the apparatus thus disclosed is extremely simple, adds effectively little or no friction to the operation of the overall system and is readily adapted for duplicate hydraulic control systems which are often required in various applications. Although the hydraulic control system with the load pressure feedback apparatus therein has been illustrated and described in some detail, such description and illustration is not to be taken by way of limitation of the present invention as defined in the claims appended hereto.

An alternative construction following the same concept could employ compliant load pressure devices such as bellows in lieu of the piston 102 and chambers 103 and 104. This construction would have the advantage of eliminating the friction associated with piston 102 and the pressurized seals of rod 105.

A further alternative construction could employ, instead of the piston actuator 26, a continuously rotatable type of hydraulic motor such as is well known to those skilled in the art. Load pressure feedback means of the type herein disclosed may operatively interconnect the command input, the power valve and a load position (or velocity) followup member in a manner to effect negative feedback in proportion to load acceleration and deceleration.

What is claimed is:

1. In a hydraulic servo control system including a power valve for controlling the flow of hydraulic fluid under pressure, mechanical linkage means operatively connected to said power valve to effect movement thereof, an actuator having a cylinder separated into first and second compartments by an actuator piston which is connected to a load, said fluid being applied across said actuator piston to move said load in response to signals applied to said system, a load pressure feedback apparatus comprising:

a housing defining a bore therein;
a slidable feedback piston having a rod affixed thereto disposed in said bore and separating said bore into first and second chambers, said rod extending externally of said bore;
means establishing continuous communication between said first and second compartments and said first and second chambers respectively;
double acting spring means positioned externally of said bore and affixed to said housing and operatively engaging said slidable member to maintain said slidable member in a predetermined neutral position in the absence of differential pressure across said slidable member; and
linkage means operatively interconnecting said slidable member and said power valve to effect movement of said power valve in response to differential pressure across said slidable member, the movement of said power valve being effective to relieve the pressure across said slidable member.

2. Load pressure feedback apparatus as defined in claim 1 wherein said rod extending externally of said bore defines the fulcrum for said linkage means interconnecting said feedback piston, and said power valve.

3. Load pressure feedback apparatus as defined in claim 1 wherein said spring means is a flat type spring affixed rigidly at each end thereof to said housing, said rod being affixed to said spring at the center of said spring.

4. In a hydraulic servo control system including a power valve for controlling the flow of hydraulic fluid under pressure, an actuating hydraulic cylinder, said cylinder comprising two fluid filled compartments separated by an actuator piston which is connected to a load to be controlled, control linkage means operatively interconnecting a mechanical signal input point, said power valve, the controlled load; a load pressure feedback apparatus comprising:

feedback control element means including two chambers, respective fluid conduits connected from said cylinder compartments to said two chambers to provide continuous communication therebetween so that said feedback element means is moved away from a neutral position in response to a pressure differential existing between said chambers irrespective of how created;

centering spring means connected to said feedback control element means to cause said feedback element means to displace an amount proportional to the differential pressure existing between said chambers and to hold the feedback element means in a neutral position in the absence of such differential pressure; and linkage means operatively interconnecting said feedback control element means, the power valve and the load in a manner to produce negative control feedback responsive to load acceleration or deceleration.

References Cited

UNITED STATES PATENTS 3,272,062   9/1966   Flippo et al. _____ 91—384

PAUL E. MASLOUSKY, *Primary Examiner*.